US006937568B1

(12) United States Patent
Nicholl et al.

(10) Patent No.: US 6,937,568 B1
(45) Date of Patent: Aug. 30, 2005

(54) ADAPTIVE RATE SHAPING TO PREVENT OVERFLOW

(75) Inventors: Gary Nicholl, Kanata (CA); Jean-Yves Ouellet, Ottawa (CA); David Tsiang, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/439,388

(22) Filed: Nov. 15, 1999

(51) Int. Cl.[7] .................................................. H04J 1/16
(52) U.S. Cl. .................................. 370/236; 370/395.62
(58) Field of Search ........................ 370/395.62, 395.7, 370/428, 472, 476, 503, 505, 506, 509, 512, 514, 540, 229, 230, 230.1, 232, 233, 234, 235, 252, 253, 236

(56) References Cited

U.S. PATENT DOCUMENTS 4,901,277 A * 2/1990 Soloway et al. ............ 364/900

* cited by examiner

*Primary Examiner*—Wellington Chin
*Assistant Examiner*—Brenda Pham
(74) *Attorney, Agent, or Firm*—Hamilton, Brook, Smith & Reynolds, P.C.

(57) ABSTRACT

The rate at which a node transmits data is modified dependent on the receive rate by selecting one of a plurality of predetermined quantum values dependent on the difference between the number of bytes received and the number of bytes transmitted. An offset equal to the difference between the number of bytes transmitted and the number of bytes received is compared to a predetermined threshold value. A predetermined quantum value is selected dependent on the result of the comparison. Rate shaping is applied to the transmit data by halting data transmission for an inter-gap interval dependent on the selected quantum value.

35 Claims, 6 Drawing Sheets

ADAPTIVE RATE SHAPING TO PREVENT OVERFLOW

BACKGROUND OF THE INVENTION

A major problem in a synchronous data network is preventing data overflow in a node in which data is being received faster than it is being transmitted. Receive and transmit data rates in a node differ if there is a difference in frequency between the receive clock and the transmit clock. This frequency difference occurs if the transmit data rate is dependent on the node's transmit clock and the receive data rate is dependent on the adjacent node's transmit clock.

One method for preventing overflow is to synchronize the transmit clock and the receive clock. One such clock synchronization method is described in U.S. Pat. No. 5,896,427 issued on Apr. 20, 1999 entitled "System and Method for Maintaining Network Synchronization Utilizing Digital Phase Comparison Techniques with Synchronous Residual Time Stamps" by Muntz et al. This method requires synchronizing on a per bit basis which is complex and expensive and can not be used on all data networks.

Another method for preventing data overflow is to provide a large buffer in the node. The disadvantages of this method are that the buffer adds delay to the transfer of data through the node, the addition of a buffer to the node increases the cost of the node and the buffer cannot prevent overflow if the buffer is not large enough.

Yet another method for preventing data overflow is to implement flow control in the node. Flow control requires large buffers which add delay through the node. Also, flow control can not be used in all data networks, such as wide area networks.

SUMMARY OF THE INVENTION

In a node connected to a computer network the transmit data rate and the receive data rate are synchronized by modifying the transmit data rate. The transmit data rate is increased or decreased dependent on an offset equal to the difference between the number of bytes received and the number of bytes transmitted. The offset selects the predetermined quantum value used to modify the transmit data rate.

If the offset is less than or equal to a predetermined threshold, a quantum value is selected to decrease transmit data rate. If the offset is greater than the predetermined threshold, a quantum value is selected to increase the transmit data rate. The quantum value is dependent on the inaccuracy between the receive clock and the transmit clock. Preferably the offset is incremented every time a predetermined number of bytes is received and decremented every time the predetermined number of bytes is transmitted.

The transmitter modifies the data transmit rate by halting transmission of transmit data for a period of time dependent on the selected quantum value.

The present invention eliminates the need for expensive and complex clock synchronization required in existing synchronous computer networks, such as the Synchronous Optical NETwork ("SONET") network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
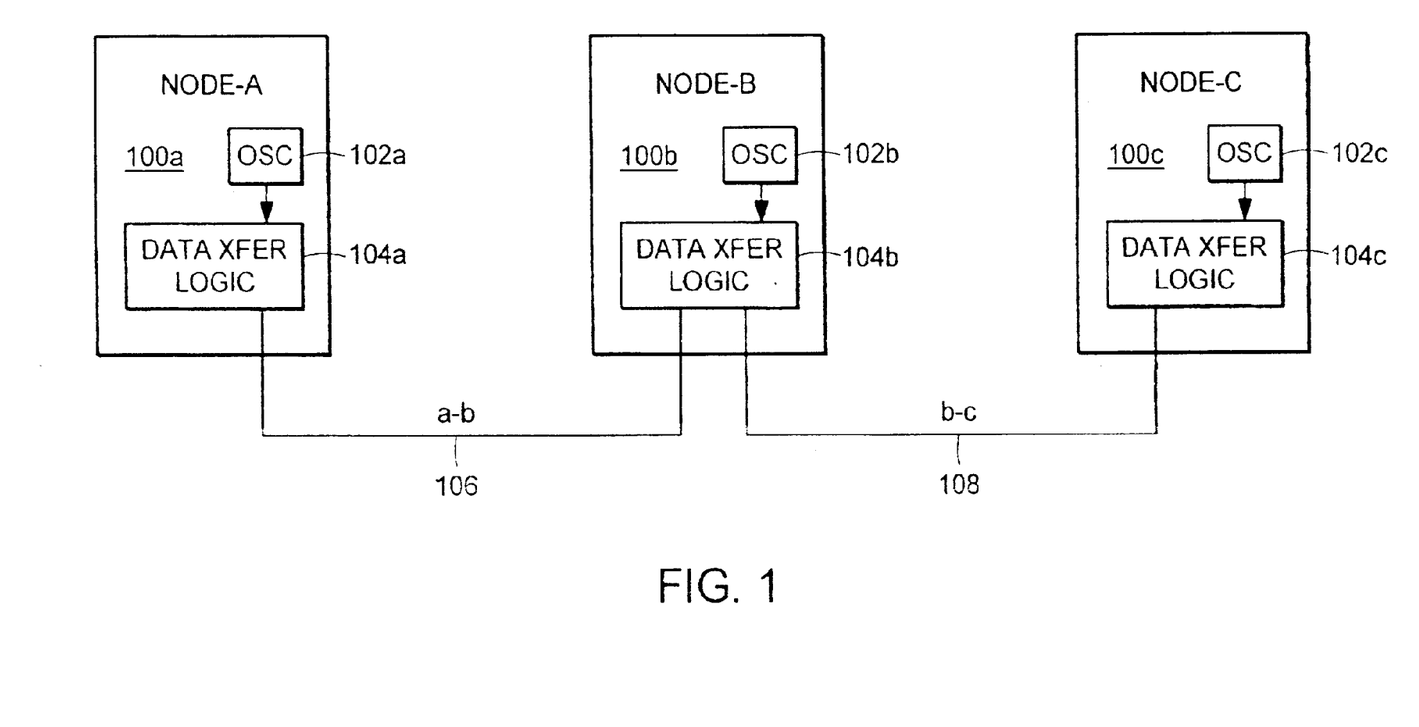
FIG. 1 illustrates a computer network with three nodes connected by network links, with each node including a data transfer logic providing adaptive rate scheduling according to the principles of the present invention.

FIG. 1 illustrates a computer network with three nodes 100*a–c* connected through computer links 106, 108. Each of the nodes includes an oscillator 102*a–c* and data transfer logic 104*a–c*. The nodes 100*a–c* connected to the network operate in "free-run" mode. That is, the receive clock is derived from the incoming receive data stream and the transmit clock is derived from the local oscillators 102*a–c*. The receive clock is encoded in the incoming receive data stream using techniques well known in the art, for example, Manchester encoding or 8B/10B encoding.

Node_A 100*a* is connected to Node_B 110*b* through communications link a-b 106. Node_B 100*b* is connected to Node_C 100*c* through communications link b-c 108. In order to transmit data from Node_A 100*a* to Node_C 100*c*, the data flows through the data transfer logic 104*b* in Node_B 100*b*. The rate at which data is transmitted from Node_A 100*a* is dependent on the frequency of Node_A's oscillator 102*a*. The rate at which data is transmitted from Node_B 100*b* is dependent on the frequency of Node_B's oscillator 102*b*.

Thus, the rate at which data is received at Node_B 100*b* on communications link a-b 106, that is, Node_B's 100*b* incoming rate may differ from the rate at which it is transmitted to Node_C 100*c* on communications link b-c 108, that is, Node_B's 100*b* outgoing rate. Synchronization of the outgoing data rate with the incoming data rate is performed by inserting an idle bandwidth at Node_B's 100*b* output. Idle is defined as no data being transmitted from Node_B 100*b* while the data transfer logic 104*b* is enabled for transmitting.

In Node_B 100*b*, the maximum and minimum outgoing rates are determined as shown in Equations 1 and 2 below, where the clock inaccuracy is the difference in frequency between the receive clock from Node_A 100*a* and the transmit clock in Node_B 100*b*:

maximum outgoing rate=incoming rate (1+clock inaccuracy)  Equation 1 minimum outgoing rate=incoming rate (1−clock inaccuracy)  Equation 2

Figure 2:
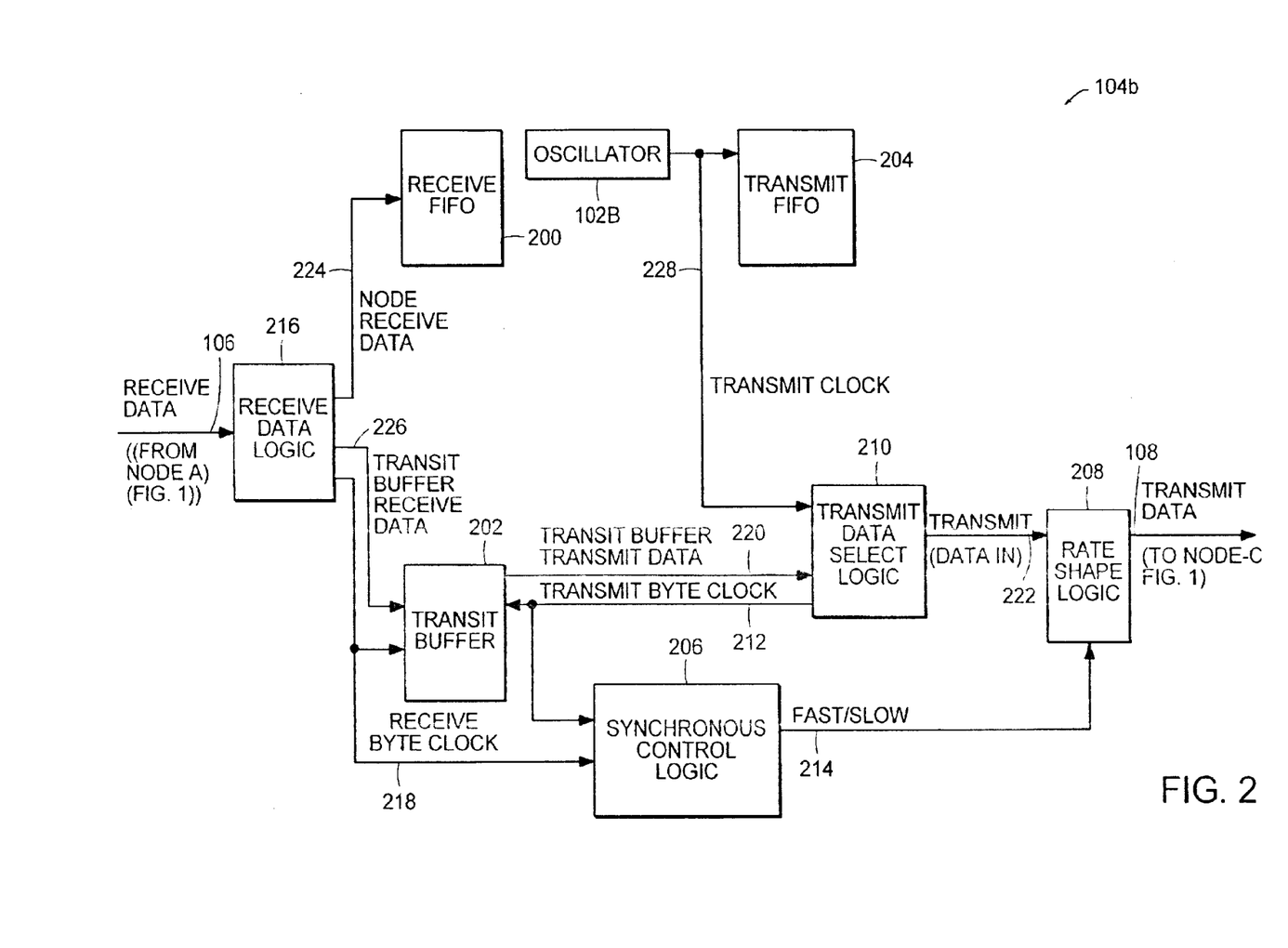
FIG. 2 is a block diagram illustrating the data transfer logic shown in FIG. 1.

FIG. 2 is a block diagram illustrating the data transfer logic 104*b* in Node_B 100*b* shown in FIG. 1. Receive Data logic 216 determines if the destination of the data received on communications link a-b 106 is Node_B 100*b* or Node_C 100*c*. If Node_B 100*b* is the destination of the data, the received data is forwarded through node receive data 224 to the Receive FIFO 200. If Node_B 100b is not the destination of the data, the received data is forwarded through transit buffer receive data 226 to the transit buffer 202 and forwarded through the transmit data select logic 210 and the rate shape logic 208 to Node_C 100c (FIG. 1) on communications link b-c 108.

The receive data logic 216 recovers the receive byte clock 218 encoded in the data received on communications link a-b 106. The method for deriving the receive byte clock 218 is dependent on the technique used to encode the receive clock in Node_A 100a. The transit buffer receive data 226 is inserted in the transit buffer 202 dependent on the receive byte clock 218.

The oscillator 102b provides a transmit clock 228 for transmitting data on communications link b-c 108 to Node_C 100c (FIG. 1). The data transmitted on communications link b-c 108 is the data received from Node_A 100a (FIG. 1) stored in the transit buffer 202 to be forwarded to Node_C 100c (FIG. 1) or the data originating in Node_B 100b in the Transmit FIFO 204. The transmit data select logic 210 selects the transmit data to forward on transmit data in 222 to the rate shape logic 208.

The transmit data select logic 210 generates a transmit byte clock 212 dependent on the transmit clock 228. Transit buffer transmit data 220 is removed from the transit buffer 202 dependent on the transmit byte clock 212. Thus, the receive byte clock 218 and transmit byte clock 212 control the insertion and removal of a predetermined number of bytes into or from the transit buffer 202.

In one implementation of the transit buffer 202 well-known in the art, the transit buffer 202 may be a First In-First Out ("FIFO") memory, with transmit buffer receive data 226 inserted at the bottom of the transit buffer 202 dependent on the receive byte clock 218, and transit buffer transmit data 220 removed from the top of the transit buffer 202 dependent on the transmit byte clock 212.

The synchronous control logic 206 monitors the rate at which transit buffer receive data 226 is inserted into the transit buffer 202 dependent on the receive byte clock 218 and the rate at which transit buffer transmit data 220 is removed from the transit buffer 202 dependent on the transmit byte clock 212. The synchronous control logic 206 sets a fast/slow signal 214 to fast or slow dependent on an offset equal to the difference between the number of bytes inserted into the transit buffer 202 and the number of bytes removed from the transit buffer 202. The fast/slow signal 214 is forwarded to the rate shape logic 208.

The rate shape logic 208 inserts idle bandwidth on communications link b-c 108 by transmitting no data for a predetermined time interval dependent on the state of the fast/slow signal 214. The idle bandwidth accounts for the rate difference between the incoming data rate on communications link b-c 108 and the outgoing data rate on communications link a-b 106. Thus, data is transmitted on communications link b-c 108 at a rate dependent on the receive data rate on communications link a-b 106. The overall transmit rate of the node is rate shaped to accommodate the worst case difference between the receive byte clock 218 and the transmit byte clock 212.

Figure 3:
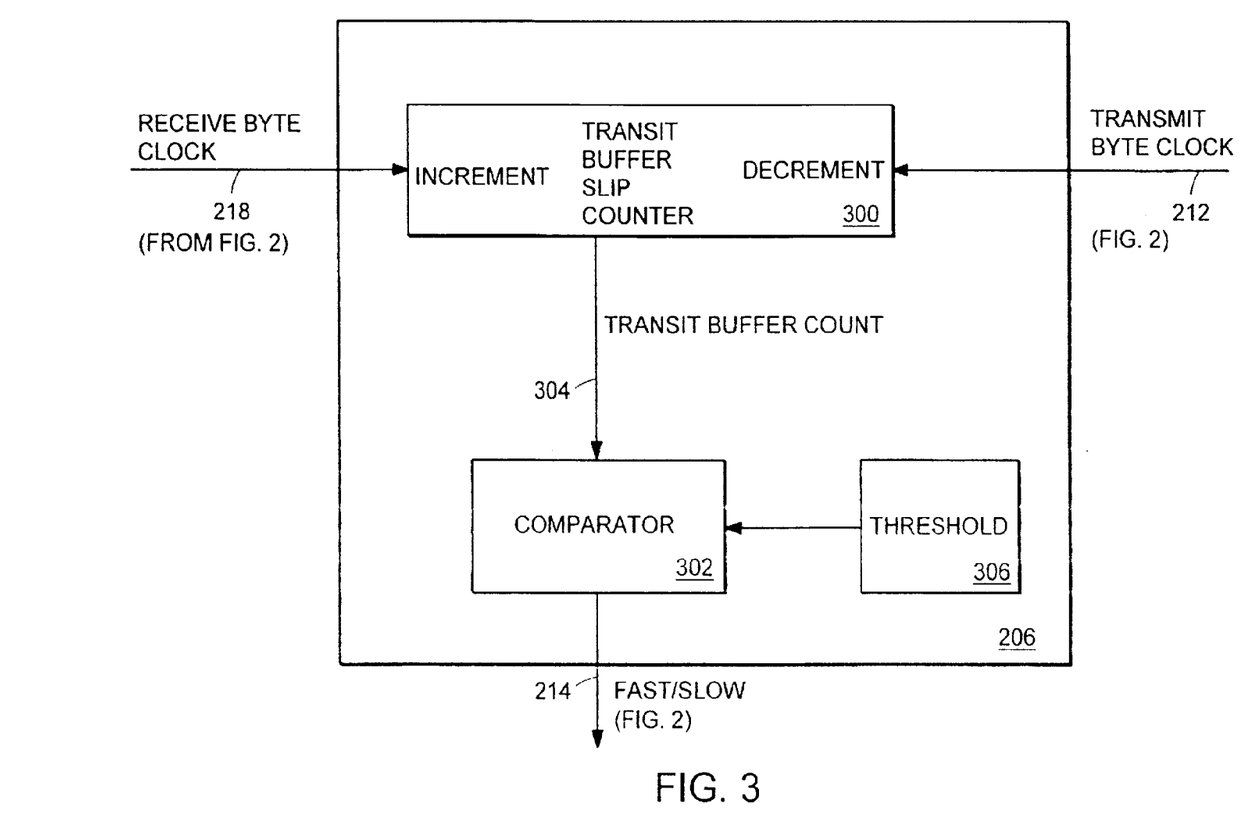
FIG. 3 is a block diagram illustrating the synchronous control logic shown in FIG. 2.

FIG. 3 is a block diagram illustrating the synchronous control logic 206 shown in FIG. 2. The synchronous control logic 206 includes a transit buffer slip counter 300, a comparator 302, and a threshold register 306. The transit buffer count 304 is a positive number or zero. If a node 100 is idle before data is received into the transit buffer 202 (FIG. 2), the transit buffer slip counter 300 is reset to set the transit buffer count 304 to zero. The transit buffer slip counter 300 is incremented by the receive byte clock 218 every time a predetermined number of bytes of transit buffer receive data 226 (FIG. 2) are inserted into the transit buffer 202 (FIG. 2) and is decremented by a transmit byte clock 212 every time the predetermined number of bytes of transit buffer transmit data 220 (FIG. 2) are removed from the transit buffer 202 (FIG. 2).

The predetermined number of bytes of data, that is, the width of the transit buffer 202 (FIG. 2) may be dependent on a SONET optical carrier ("OC") standard implemented in the node 100 (FIG. 1). For example, the preset number of bytes for OC-3 is one, the preset number of bytes for OC-12 is two and the preset number of bytes for OC-48 is four.

Thus, if OC-12 is implemented in the node 100, the transit buffer slip counter 300 is incremented by the receive byte clock 218 every time two bytes are inserted in the transit buffer 200 (FIG. 2). The transit buffer count 304, a positive integer, is the difference between the number of bytes inserted in the transit buffer 300 and the number of bytes removed from the transit buffer 300.

A threshold register 306 stores a predefined threshold value. The threshold value determines the transit buffer count 304 at which the current transmit rate is to be adjusted. The threshold value is selected such that, if the receive data rate is equal to the transmit date rate, the transit buffer count 304 will vary between the selected threshold value and zero.

The comparator 302 compares the transit buffer count 304 with the threshold value stored in the threshold register 306 and determines whether to set the fast/slow signal 214 to fast or slow. If the transit buffer count 304 is less than the threshold value stored in the threshold register 306, the fast/slow signal 214 is set to slow to decrease or maintain the current transmit rate. If the transit buffer count 304 is greater than or equal to the threshold value stored in the threshold register 306, the fast/slow signal 214 is set to fast to increase the transmit rate. Thus, if the transmit rate is equal to the receive rate the transit buffer count 304 will be less than or equal to the threshold value stored in the threshold register 306 and the fast/slow signal 214 is set to slow. The fast/slow signal 214 is forwarded to the rate shape logic 208 (FIG. 2) to modify the transmit rate.

Figure 4:
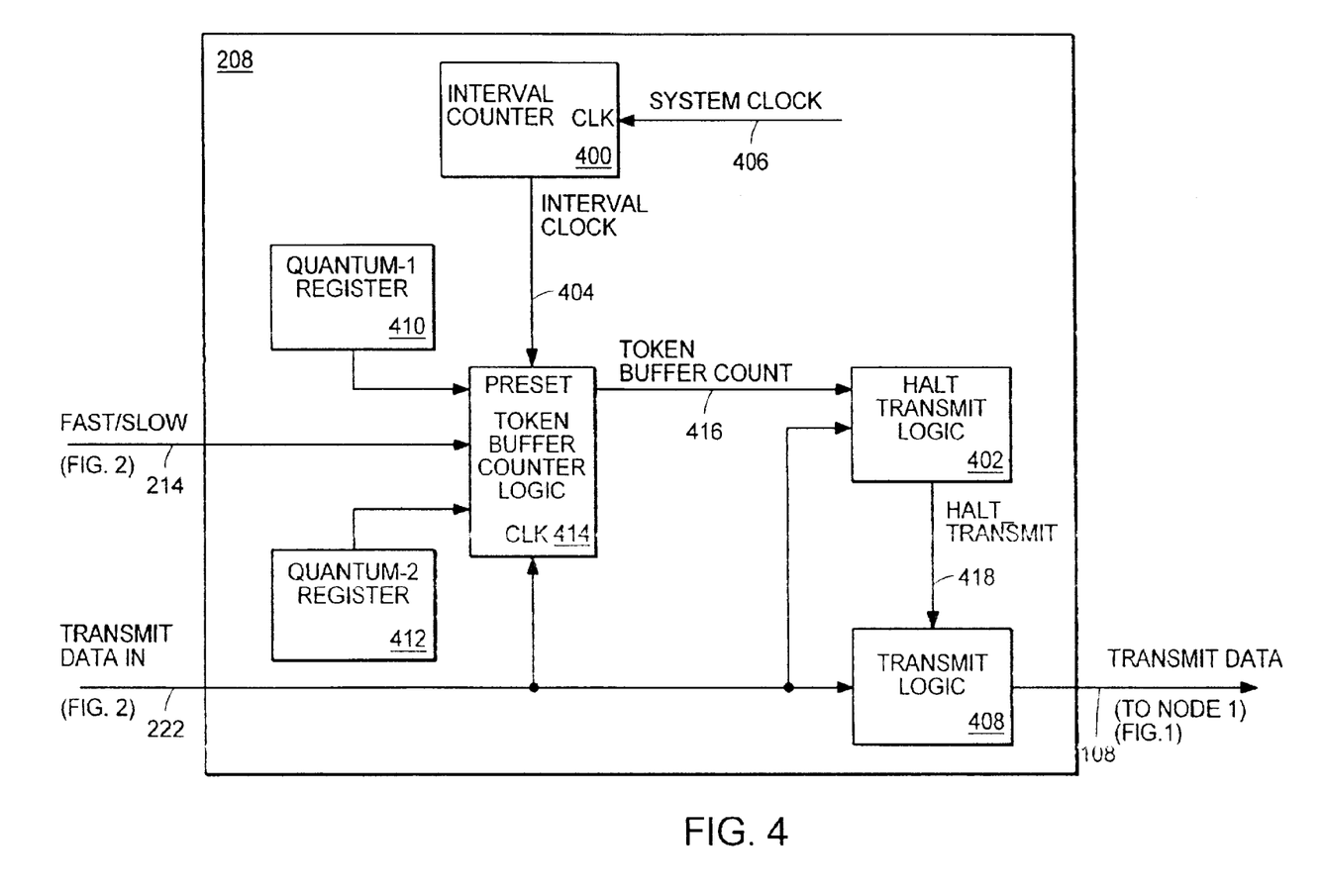
FIG. 4 is a block diagram illustrating the rate shape logic shown in FIG. 2.

FIG. 4 is a block diagram illustrating the rate shape logic 208 shown in FIG. 2. The rate shape logic 208 includes an interval counter 400, a token buffer counter logic 414, halt_transmit logic 402, transmit logic 408, a Quantum_1 register 410, and a Quantum _2 register 412.

The Quantum_1 register 410 and the Quantum_2 register 412 store fixed values or quanta. The Quantum_1 and Quantum_2 values are used as disclosed herein to adjust the transmit or outgoing rate of the node to account for discrepancies between the clocks of adjacent nodes. The Quantum_1 register 410 stores a Quantum_1 value to set the outgoing or transmit rate according to Equation 1. The Quantum_2 register 412 stores a Quantum_2 value to set the outgoing or transmit rate according to Equation 2. The number of quantum values stored is not limited to the two quantum values, as shown, more than the two quantum values may be stored in order to provide multiple adjustments to the transmit data rate.

The interval counter 400 defines the interval period over which rate shaping is performed and provides an interval clock 404 with a period equal to the interval period. The interval counter 400 is clocked by the system clock 406 in the node 100. The interval period is selected such that it is sufficiently large to provide accurate rate shaping.

The token buffer count logic 414 counts the number of bytes transmitted from the node 100. The interval clock 404 is forwarded to the token buffer count logic 414. The Quantum_1 value or the Quantum_2 value is added to the token buffer count 416 in the token buffer count logic 414 at the start of an interval period dependent on the state of the fast/slow signal 214. The token buffer count 416 is decremented by the token buffer count logic 414 dependent on transmit data in 222 as data is transmitted from the node 100.

The halt_transmit logic 402 monitors the token buffer count 416 and the data being transmitted on transmit data in 212. Upon determining that the token buffer count 416 is less than zero and there is a packet boundary, the halt_transmit logic 402 generates the halt_transmit signal 418. If the token buffer count 416 is less than zero and a packet boundary has not been reached, the token buffer count logic 414 continues to decrement the token buffer count 416 until a packet boundary has been reached. The halt_transmit signal 418 is forwarded to the transmit logic 408. While the halt_transmit signal 218 is asserted the transmit logic 408 does not allow transmit data in 222 to be forwarded from the node 100. In each interval period, the halt_transmit signal 418 is asserted for a period of time dependent on the token buffer count 416 at the beginning of the interval period, the length of the interval period and the token buffer count 416 at the end of the interval period.

Thus, over a large number of interval periods, the halt_transmit signal 418 is asserted for an average period of time equal to the length of the interval period minus the average value token added to the token buffer counter logic at the beginning of each interval period, where the token added may be either the stored Quantum_1 value or Quantum_2 value.

The Quantum_1 and Quantum_2 values are determined by solving for Equations 4 and 5 after substituting Equation 3 in Equations 1 and 2:

$$\text{outgoing rate} = \text{quantum/interval} * \text{system clock rate} \quad \text{Equation 3}$$

The incoming rate is dependent on the OC standard implemented in the node 100. The incoming rate is the bandwidth available for the data payload excluding the bandwidth for overhead bytes. For example, for OC-12, the incoming rate is the Synchronous Payload Envelope ("SPE") and is 600 Megabits per second ("Mbps"). The clock inaccuracy is determined by the worst case difference between the frequency of the receive and transmit clocks of adjacent nodes.

Thus, knowing the constant value for the clock inaccuracy, and selecting a constant interval period, the constant values for the Quantum_1 and Quantum_2 values can be calculated. These values are calculated one time for the node and stored in the Quantum_1 and Quantum_2 registers 410, 412 so that they can be used to adjust an inter-packet gap at the beginning of each interval period.

$$\text{quantum}\_1 = \text{interval period} * (\text{receive rate/system clock rate}) * (1 - \text{clock inaccuracy}) \quad \text{Equation 4}$$

$$\text{quantum}\_2 = \text{interval period} * (\text{receive rate/system clock rate}) * (1 + \text{clock inaccuracy}) \quad \text{Equation 5}$$

The selection of the Quantum_1 and Quantum_2 values is described for a numerical example for which the interval period is selected to be $2^{18}$ system clock cycles (262,144 clock cycles) and the OC-12 line rate, that is, the incoming rate, is 600 Mbps. The system clock is 50 Megahertz (MHz), therefore at two bytes per system clock, the system clock rate is 800 Mbps (16 bits @ 50 Mhz). The frequency of the receive clock dependent on Node_A's oscillator 102a (FIG. 1) and the frequency of the transmit clock dependent on Node_B's oscillator 102b (FIG. 1) differ by no more than 100 parts per million (ppm). Thus, the clock inaccuracy is $10^{-4}$. Solving Equations 4 and 5 using the above numerical values, Quantum_1 is 196,588 and Quantum_2 is 196,628.

Thus, 196,588 clock cycles or 196,628 clock cycles are added to the token buffer counter logic 414 dependent on the state of the fast/slow signal 214. The halt_transmit signal 218 is asserted when the token buffer counter logic 404 is equal or less than zero. At the end of the interval period at 262,144 clock cycles the token buffer count 416 is again summed with Quantum_1 or, Quantum_2 dependent on the state of the fast/slow signal 214.

Figure 5:
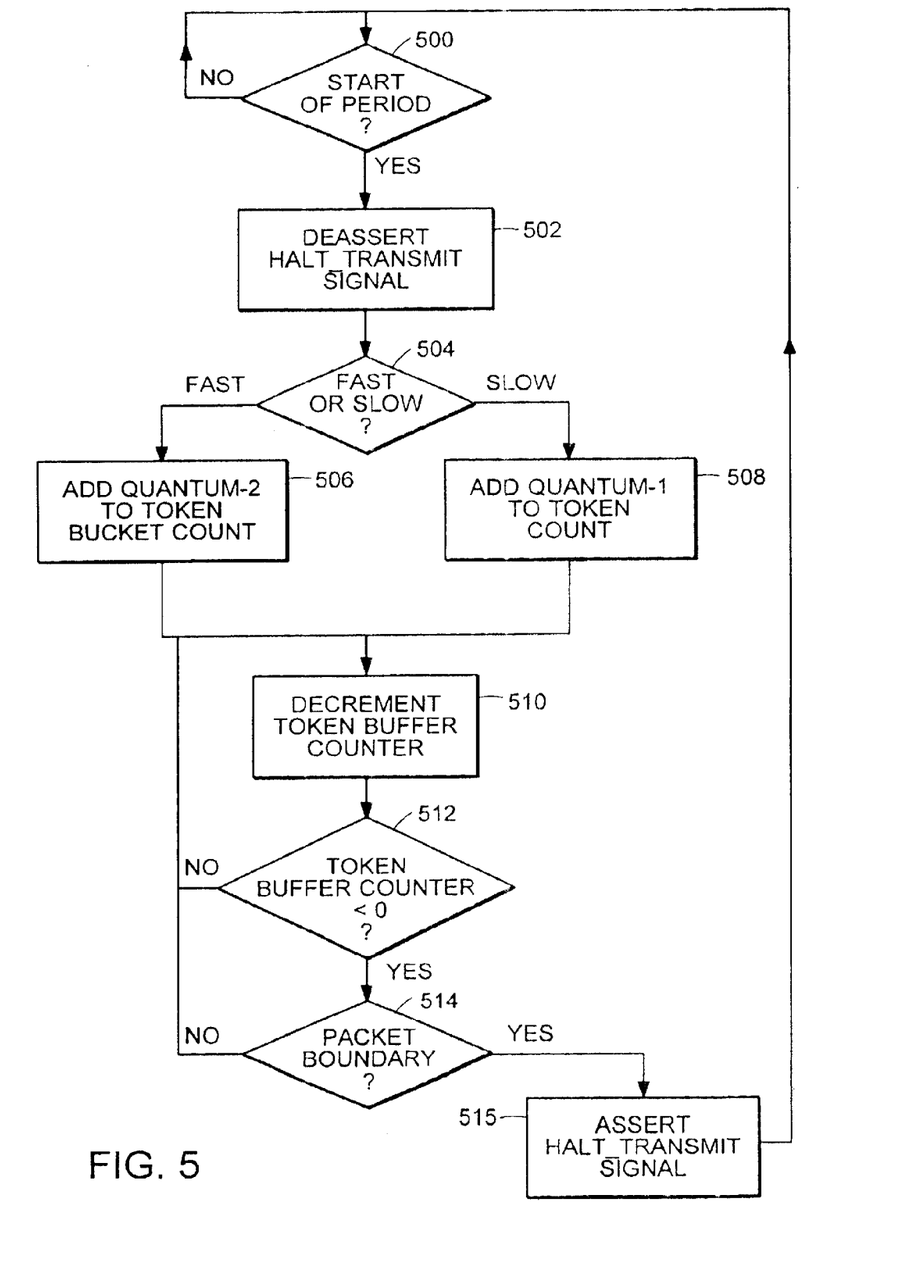
FIG. 5 is a flow diagram illustrating the steps for providing rate shaping in the rate shape logic shown in FIG. 4.
Figure 6:
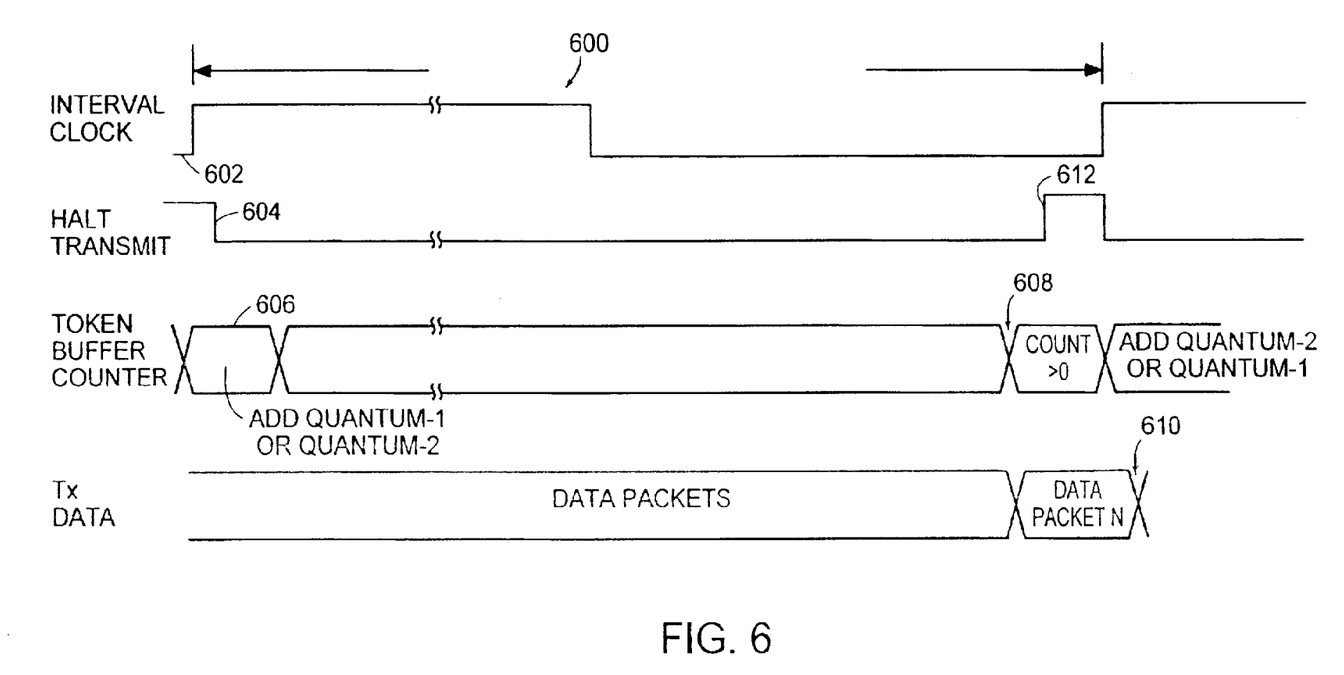
FIG. 6 is a timing diagram illustrating the timing of the signals in the rate shape logic shown in FIG. 4.

FIG. 5 is a flow diagram illustrating the steps for providing rate shaping in the rate shape logic 208 shown in FIG. 4. FIG. 6 is a timing diagram illustrating the timing of the signals in the rate shape logic 208 shown in FIG. 4. The operation of the rate shape logic 208 is described in conjunction with FIGS. 4–6.

The interval period 600 is shown in FIG. 6. At the start of the interval period 602, the halt_transmit signal 218 (FIG. 4) is asserted.

Continuing with FIG. 5, at step 500, if the start of an interval period 600 (FIG. 6) is detected processing continues with step 502.

At step 502, the halt_transmit signal 218 (FIG. 4) is de-asserted as shown at 604 (FIG. 6) allowing data to be transmitted from the node 100 on communications link b-c 108 (FIG. 4). Processing continues with step 504.

At step 504, the token buffer counter logic 414 (FIG. 4) determines from the fast/slow signal 214 whether to add Quantum_1 or Quantum_2 to the token buffer count 416. If the fast/slow signal 214 is set to fast processing continues with step 506. If the fast/slow signal 214 is set to slow processing continues with step 508.

At step 506 in the token buffer counter logic 414, Quantum_2 is added to the token buffer count 416 (FIG. 4) at 606 (FIG. 6). Processing continues with step 510.

At step 508 in the token buffer counter logic 414, Quantum_1 is added to the token buffer count 416 (FIG. 4) at 606 (FIG. 6). Processing continues with step 510.

At step 510, as data is transmitted on the transmit data signal 108 (FIG. 4), the token buffer counter logic 414 (FIG. 4) is decremented dependent on transmit data in 222 (FIG. 4). Processing continues with step 512.

At step 512, the halt_transmit logic 402 (FIG. 4) monitors the token buffer count 416 (FIG. 4). If the token buffer count 416 (FIG. 4) is less than zero as shown at 608 (FIG. 6) processing continues with step 514. If not, processing continues with step 510.

At step 514, the halt_transmit logic 402 (FIG. 4) monitors transmit data in 222 (FIG. 4). If a packet boundary is detected as shown at 610 (FIG. 6), processing continues with step 515. If not, processing continues with step 510.

At step 515, the halt_transmit logic 402 (FIG. 4) asserts the halt_transmit signal 418 (FIG. 4) at 612 (FIG. 6) to halt data transfer on communications link b-c 108 (FIG. 4). Processing continues with step 500.

Thus, an inter-packet gap is generated by disabling transmit data from the node for a period of time dependent on the difference between the receive data rate and the transmit data rate.

While this invention has been particularly shown and described with reference to preferred embodiments within thereof, it will be understood by those skilled in the art that various changes in form and details may be made therein without departing from the scope of the invention encompassed by the appended claims.

What is claimed is:

1. In a node connected to a network in which data is transmitted in bytes and received in bytes a method comprising:

synchronizing a rate at which data is transmitted from the node and a rate at which data is received at the node by determining the number of bytes received at the node and the number of bytes transmitted from the node during a current interval period and modifying the number of bytes to be transmitted from the node in a next interval period by halting data transmission from the node in the next interval period for a period of time dependent on a difference between the number of bytes transmitted from the node and the number of bytes received at the node during the current interval period.

2. The method as claimed in claim 1, wherein the step of determining comprises:

providing an offset equal to the difference between the number of bytes received and the number of bytes transmitted; and selecting one of a plurality of predetermined quantum values dependent on the offset.

3. The method as claimed in claim 2, wherein the quantum value is selected to increase the transmit data rate if the offset is greater than a predetermined threshold.

4. The method as claimed in claim 2 wherein the quantum value is selected to decrease the transmit data rate if the offset is less than or equal to a predetermined threshold.

5. The method as claimed in claim 2, wherein the quantum value is dependent on an inaccuracy between a receive clock and a transmit clock.

6. The method as claimed in claim 2, wherein the step of providing further comprises:

incrementing the offset every time a predetermined number of bytes are received; and decrementing the offset every time a predetermined number of bytes are transmitted.

7. The method as claimed in claim 2, wherein the number of bytes transmitted is dependent on the selected quantum value.

8. A method as claimed in claim 7, wherein transmission of data from the node is halted at a packet boundary for the period of time dependent on the selected quantum value.

9. In a node connected to a network in which data is transmitted in bytes and received in bytes an apparatus comprising:

synchronization control logic which determines a difference between the number of bytes received at the node and the number of bytes transmitted from the node during a current interval period; and rate adapt logic which modifies the number of bytes to be transmitted from the node in a next interval period by halting data transmission for a period of time dependent on the difference between the number of bytes transmitted from the node and the number of bytes received at the node during the current interval period to synchronize the rate at which data is transmitted and the rate at which data is received.

10. The apparatus as claimed in claim 9, wherein the synchronization control logic further comprises:

count logic which provides an offset equal to the difference between the number of bytes received and the number of bytes transmitted; and comparator logic which selects one of a plurality of predetermined quantum values dependent on the offset.

11. The apparatus as claimed in claim 10, wherein the comparator logic selects the predetermined quantum value to increase the transmit data rate if the offset is greater than a predetermined threshold.

12. The apparatus as claimed in claim 10, wherein the comparator logic selects the predetermined quantum value to decrease the transmit data rate if the offset is less than or equal to a predetermined threshold.

13. The apparatus as claimed in claim 10, wherein the predetermined quantum value is dependent on an inaccuracy between a receive clock and a transmit clock.

14. The apparatus as claimed in claim 10, wherein the counter logic further comprises:

increment logic vehicle increments the offset every time a predetermined number of bytes are received; and decrement logic which decrements the offset every time a predetermined number of bytes are transmitted.

15. The apparatus as claimed in claim 10, wherein the number of bytes transmitted is dependent on the selected quantum value.

16. The apparatus as claimed in claim 15 wherein the rate shape logic further comprises:

halt transmission logic which halts transmission of data from the node at a packet boundary for the period of time dependent on the selected quantum value.

17. In a node connected to a network in which data is transmitted in bytes and received in bytes an apparatus comprising:

means for determining a difference between the number of bytes received at the node and the number of bytes transmitted from the node during a current interval period; and rate adapt logic which modifies the number of bytes to be transmitted from the node in a next interval period by halting data transmission for a period of time dependent on the difference between the number of bytes received at the node and the number of bytes transmitted from the node during the current interval period to synchronize the rate at which data is transmitted and the rate at which data is received.

18. The apparatus as claimed in claim 17, wherein the means for determining further comprises:

means for providing an offset equal to the difference between the number of bytes received and the number of bytes transmitted; and means for selecting one of a plurality of predetermined inter-packet time intervals dependent on the offset.

19. The apparatus as claimed in claim 18, wherein the means for selecting selects the predetermined quantum value to increase the transmit data rate if the offset is greater than a predetermined threshold.

20. The apparatus as claimed in claim 18, wherein the means for selecting selects the predetermined quantum value to decrease the transmit data rate if the offset is less than or equal to a predetermined threshold.

21. The apparatus as claimed in claim 18, wherein the predetermined quantum value is dependent on an inaccuracy between a receive clock and a transmit clock.

22. The apparatus as claimed in claim 18, wherein the means for determining further comprises:

means for incrementing the offset every time a predetermined number of bytes are received; and means for decrementing the offset every time a predetermined number of bytes are transmitted.

23. The apparatus as claimed in claim 18, wherein the number of bytes transmitted is dependent on the selected quantum value.

24. The apparatus as claimed in claim 18 wherein the rate shape logic further comprises:

means for halting transmission of data from the node at a packet boundary for the period of time dependent on the selected quantum value.

25. In a node connected to a network in which data is transmitted in bytes and received in bytes a transmitter comprising:

rate adapt logic which modifies the number of bytes to be transmitted in a next interval period by halting data transmission for a period of time dependent on a difference between the number of bytes received and the number of bytes transmitted in a current interval period to synchronize the rate at which data is transmitted and the rate at which data is received.

26. In a node connected to a network in which data is transmitted in bytes and received in bytes a receiver comprising:

synchronization control logic which determines a difference between the number of bytes received at the node and the number of bytes transmitted from the node during a current interval period to synchronize the rate at which data is to be transmitted and the rate at which data is received in a next interval period by selecting a time period during which data transmission is halted in the next interval period dependent on the difference.

27. In a node connected to a network in which data is transmitted in bytes and received in bytes an apparatus comprising:

a receiver, the receiver comprising:
  synchronization control logic which determines a difference between the number of bytes received at the node and the number of bytes transmitted from the node during a current interval period; and a transmitter, the transmitter comprising:
  rate adapt logic which modifies the number of bytes to be transmitted from the node in a next interval period by halting data transmission for a period of time dependent on a difference between the number of bytes received at the node and the number of bytes transmitted from the node during the current interval period to synchronize the rate at which data is transmitted and the rate at which data is received.

28. A computer program product for preventing overflow in a node connected to a synchronous data network in which data is transmitted in bytes and received in bytes, the computer program product comprising a computer usable medium having computer readable code thereon, including program code which:

synchronizes a rate at which data is transmitted from the node and a rate at which data is received at the node by determining the number of bytes received at the node and the number of bytes transmitted from the node during a current interval period and modifies the number of bytes to be transmitted from the node in a next interval period by halting data transmission in the next interval period dependent on a difference between the number of bytes transmitted and the number of bytes received in the current interval period.

29. The computer program product of claim 28 wherein the program code:

provides an offset equal to the difference between the number of bytes received and the number of bytes transmitted; and selects one of a plurality of predetermined quantum values dependent on the offset.

30. The computer program product of claim 29, wherein the quantum value is selected to increase the transmit data rate if the offset is greater than a predetermined threshold.

31. The computer program product of claim 29 wherein the quantum value is selected to decrease the transmit data rate if the offset is less than or equal to a predetermined threshold.

32. The computer program product of claim 29, wherein the quantum value is dependent on an inaccuracy between a receive clock and a transmit clock.

33. The computer program product of claim 29, wherein the program code:

increments the offset every time a predetermined number of bytes are received; and decrements the offset every time a predetermined number of bytes are transmitted.

34. The computer program product of claim 29, wherein the number of bytes transmitted is dependent on the selected quantum value.

35. The computer program product of claim 34 wherein the program code:

halts transmission of data from the node at the packet boundary for the period of time dependent on the selected quantum value.

* * * * *